United States Patent
Harding

[11] Patent Number: 5,815,272
[45] Date of Patent: Sep. 29, 1998

[54] FILTER FOR LASER GAGING SYSTEM

[76] Inventor: Kevin G. Harding, 2805 Windwood, #11, Ann Arbor, Mich. 48105

[21] Appl. No.: 780,978

[22] Filed: Jan. 9, 1997

Related U.S. Application Data

[60] Provisional application No. 60/029,006 Oct. 23, 1996.

[51] Int. Cl.[6] ..................................................... G01B 11/14
[52] U.S. Cl. ................ 356/375; 250/559.31; 250/559.38
[58] Field of Search ................................. 356/3.01, 3.02, 356/3.03, 3.04, 3.05, 3.06, 375, 376; 250/559.23, 559.31, 559.38

[56] References Cited

U.S. PATENT DOCUMENTS

| | | |
|---|---|---|
| 4,102,571 | 7/1978 | Hayamizu et al. . |
| 4,136,949 | 1/1979 | Hayamizu et al. . |
| 4,524,282 | 6/1985 | King . |
| 4,575,211 | 3/1986 | Matsumura et al. . |
| 4,748,333 | 5/1988 | Mizutani et al. . |
| 4,781,465 | 11/1988 | Demachi et al. . |
| 4,786,815 | 11/1988 | Walker et al. . |
| 4,796,998 | 1/1989 | Soma et al. . |
| 4,864,123 | 9/1989 | Mizutani et al. . |
| 4,921,345 | 5/1990 | Tsuchitani et al. . |
| 4,988,886 | 1/1991 | Palum et al. . |
| 5,024,529 | 6/1991 | Svetkoff et al. ........................ 356/376 |
| 5,151,608 | 9/1992 | Torii et al. . |
| 5,157,487 | 10/1992 | Tajima . |

OTHER PUBLICATIONS

*Alignment Verification Using Holographic Correlation,* Kevin G. Harding and Mark Michniewicz, SPIE vol. 954 Optical Testing and Metrology II (1988).

*Primary Examiner*—F. L. Evans
*Attorney, Agent, or Firm*—Harness, Dickey & Pierce P.L.C.

[57] ABSTRACT

A filter for a laser gaging system that significantly increases the accuracy of the system when measuring scattering or translucent surfaces by reducing deviations caused by skewed speckle patterns. The filter limits the field of view of the sensor to light rays originating along the detection axis of the laser gaging system, thereby reducing the effects of noise such as halos, star patterns and beat patterns. The filter can comprise a slit filter or preferably a slit filter in combination with a grated filter, such as a tandem holographic filter.

20 Claims, 2 Drawing Sheets

FILTER FOR LASER GAGING SYSTEM

RELATED APPLICATION

This application claims the benefit of U.S. Provisional Application No. 60/029006 filed Oct. 23, 1996.

BACKGROUND AND SUMMARY OF THE INVENTION

This invention is related to laser gaging systems and particularly to a filter for a laser gaging system that significantly improves the accuracy of the laser gaging system when determining the distance to objects having scattering or translucent surfaces.

Laser gaging systems, such as triangulation-based laser gages, have seen wide use in a variety of industrial measurement applications. Laser gaging systems have largely replaced mechanical gaging systems for many types of applications, particularly applications requiring extremely rapid data sampling, such as three-dimensional imaging applications. Lasers are often used as the light source for optical gaging systems because lasers project a well controlled and intense beam of light on the surface of the object being measured.

In triangulation-based laser gaging systems, a light beam is directed onto a surface at one angle and then viewed from another angle so that a lateral displacement is seen that indicates a depth displacement in accordance with the triangulation effect. If, for example, a 1 millimeter laser spot is projected onto a surface perpendicularly and then viewed at 45 degrees from the projection axis, a change in distance from a reference datum, which is perpendicular to the projection axis, to the surface of the object by about 1 millimeter will cause an apparent displacement of the spot by one beam width or 1 millimeter. Much work has been done to provide greater sensitivity and speed to the spot displacement measurement process by using elements such as lateral effect photodiodes and detector arrays.

One approach to increasing the accuracy of laser gaging systems is to reduce the size of the spot on the surface. A smaller spot results in a finer resolution of the fixed displacement of the spot that can be measured. In the case of extremely small spots (a few tens of microns, for instance), the coherent speckle created by the surface can become very large, even compared to the size of the viewing lens, and the speckle is therefore seen as a continuous light pattern at the detector. This large speckle effect can also cause the reflected light to be re-directed by the actual micro-structure of the object surface and the center of the speckle can be translated from its expected position.

Any highly localized light scattering off a rough surface will produce a light field with a characteristic speckle distribution. The light seen at the receiver has a distribution which is influenced both by the f-number of the collection lens as well as the effective "aperture size" of features on the object surface. The speckle size can be calculated by the expression S=(wavelength)(f-number), where the f-number is the working distance divided by the effective aperture size. With a fast lens focusing on a detector, the speckle is kept to a minimum size. For example, an f/5 lens will create speckle of about 3 microns in size. As long as the detector element sees many speckles at once, their effect is averaged out. However, the effect of a rough surface is to create speckle related to the effective aperture size of the surface roughness features, which will then further modulate the speckle pattern received by the detector.

Methods used to minimize the effect of speckle have included: 1) disrupting the coherence of the light spatially by running the beam through a multi-mode fiber optic (thereby creating multiple beam lengths to the surface), 2) broadening the wavelength extent of the light source, such as by using an LED (which have typical coherence lengths of only a few hundred microns), or 3) producing a varying phase shift through the use of an electro-optic cell or rotating wave plate. All of these methods provide some relief from the coherent laser noise, depending on the type of application.

Another effect of a rough or translucent surface, however, is to create a spreading of the laser beam on the surface being measured. In the case of an opaque surface, such as metal, the effect is more one of diffusion due to the actual surface features on a micro scale. For a translucent surface, the effect may be more of a conventional scattering by particles having very small cross sections, like light scattering as it passes through the atmosphere. As with Rayleigh scattering, a shorter wavelength will scatter more than a longer wavelength, changing as the fourth power of the frequency of the light. These factors present a challenge to precise measurements using lasers or other light sources on these types of surfaces.

When a laser beam is incident on an opaque, rough surface, the micro-structure of the surface can act as though it is made from a range of small mirrors, pointing in numerous directions. These micro-mirrors may reflect the light off in a particular direction, as generally machine marks do, or may direct the light along the surface of the part. Depending on how random or directional the pointing of these micro-mirrors may be, the apparent spot seen on the surface will not be a direct representation of the light beam as incident on the part surface. The effects that may be seen from a laser beam reflecting off a rough surface include: 1) directional reflection due to surface ridges, 2) skewing of the apparent light distribution due to highlights, and 3) expansion of the incident laser spot due to micro-surface piping.

In a like manner, a translucent surface redirects the incident light beam in other than a purely elastic reflection. By the nature of a translucent surface, the light will enter the material and proceed to reflect around inside. In some cases, the light will simply spread uniformly through the translucent material, whereas for other materials the light may reflect off the opposite surface and return (causing a halo pattern around the incident spot) or the light may propagate through the surface in a preferred direction. In the case of directional internal reflections, such as in some plastics and crystalline materials, it is not unusual to see a characteristic beat pattern as the light goes through multiple reflections, and in some cases, multiple polarization shifts. The effects that may be seen from a laser beam reflecting off a translucent surface include: 1) a soft halo around the incident point (which may not necessarily be centered about the incidence point), 2) streaks of light following particular boundaries in the material (sometimes referred to as star patterns), or 3) beat patterns separated from the incident point at regular intervals. Clearly, with all of the different patterns that may be seen on scattering or translucent surfaces, simply taking the center of mass of the light may not be a good indication of the incident spot location on the surface at all. Laser triangulation, as with many other optical measurement methods, depends on the use of the diffusely reflected light from where the laser is incident upon the part surface. The spreading of this incident spot, or worse yet the creation of "ghost" spots across the surface, can cause a great deal of uncertainty or inaccuracy in the measurement.

As it is typically the diffusely scattered light that is of interest, the fact that the scatter can be reduced at longer wavelengths, or the speckle size can be reduced at shorter wavelengths is not necessarily of primary value to the system performance. Going to very long wavelengths can make most materials appear to be mirror-like or transparent, thereby decreasing the quantity of diffusely scattered light available for measurement.

The use of specular reflection as a measurement tool is, of course, inherently different from the use of the diffuse reflection. A beam of light reflecting off a mirror will move in a parallel manner for a parallel displacement of the surface. A lens collecting this specular reflection will focus all parallel beams to a common point (at its focal length). A tilt of the surface, on the other hand, will displace the focus of the beam behind the lens. This is just the opposite of the effect of the image of a spot from a diffuse surface, which will translate as the surface translates, but will be largely insensitive to a tilting of the surface.

Speckle effects, often identified as a limiting factor in laser measurements, will produce a random distribution within whatever envelope the reflected beam may have (which may itself be skewed or elongated). As long as the light is averaged over multiple speckles (so as to not skew the apparent center of mass), or the speckles are very large, they typically have little effect on the actual measurements. As discussed previously, there have been numerous methods suggested to reduce the present of speckle if so desired.

Applicant believes that the spot distribution in the image plane is the most significant factor influencing the validity and performance of diffuse reflection based laser gaging systems. A skewed peak, a ghost reflection, or a shadow in the spot image will significantly change the measured value, and in some cases, will completely mask the true location of the incident spot on the object surface.

Example data taken from a piece of ground glass, a circuit board, a conductor trace on a circuit board, and a diffuse metal surface have shown that the centroid of reflection of the metal surface is different than centroid of reflection of the other materials, particularly the conductor trace (which gives a directional reflection) and the circuit board (which is composed of a translucent material). The peak intensities lined up for each of the tested materials (which will not always be true if there are ghost peaks), but the "centers of mass" of the normalized intensities were different for each of the different types of materials. A simple defocus of the graphed intensity data showed a linear change with distance for the metal surface, whereas the other surfaces deviated from linear at an increasing rate with distance.

The general result of various tests suggests that rough or translucent surfaces can expect measurement errors ranging from 3 to 5 percent for well behaved surfaces, and up to factors of 2 to 10 times the actual reading in the case of directional reflections and ghost images.

One method to correct for these skewed intensity distributions is to view the entire spot with a two dimensional camera. By using two dimensional recognition based on a model of the object surface, repeatable results have been shown, but at a substantial expense of data collection and processing time. In the case of conventional two dimensional video, each point will take at least a thirtieth of a second to collect, because it is driven by the camera frame rate. More dedicated hardware has brought these times down to one hundredth of a second. However, even 100 points per second is extremely slow compared to data rates of 20,000 to over 500,000 points per second which have been achieved by centroid detection based laser gages.

Much of the difficulty leading to skewed spot profiles arises from the need to view the laser spot on the part surface at some skewed angle. In some cases, the oblique view of the laser spot itself produces a biased light distribution, with the part of the spot closest to the receptor being the brightest, simply based upon distance and magnification factors. One way around the problem of the skewed beam is to use the light distribution perpendicular to the skew or scatter direction. This approach, however, precludes the use of the triangulation effect, which only exists within the plane of incidence of the laser beam. A system using this approach is not useful for measuring surfaces that might otherwise be measured by a mechanical plunger gage, which is the model for the laser triangulation gage.

It is also a problem to view a very small spot, as discussed above, simply because the depth-of-field becomes very small. In the simplest case, the depth-of-field problem can be addressed by imaging the plane containing the illumination beam, rather than the plan of the part. As the laser beam is then always in the image plane, anywhere the spot hits the part, it will, by definition, be in focus. This image plane approach, though simple, is often not desirable due to the high angles, and the high off-axis view it requires to be effective. However, the underlying concept of this approach can be applied in another way. The concept underlying the image plane approach is that we know where the laser beam is going, and any reflection is only of interest if it is "along the line in which the laser beam resides".

Using this knowledge about where the beam is going allows areas that are not in the line of sight of the laser to be potentially ignored. Implementing this arrangement, however, may not be as simple as it seems, simply because the viewing axis is necessarily not "in-line" with the illumination beam, or there would not be any triangulation displacement. Restricting the view to a limited region at a time provides a first approximation of the desired type of noise rejection.

There are a few known methods for restricting the view of the viewing optics. The first approach is the simple use of baffles at the lens itself. This approach will tend to restrict the view of the lens to that area where the laser light is expected to strike the surface, though not necessarily the actual location (i.e. it should not limit the range of distances measurable by the system). Light coming from wide angles can often cause flare or stray reflections that may not even be recognized as a factor in the image to a human observer, because human visual systems are good at ignoring side distractions. The general practice of blackening internal structures of the sensors has also done much to reduce such flare from multiple reflections. This does not, however, provide a substantial improvement when measuring translucent or rough surfaces, where the stray light is still within the expected field of view.

An active variation of restricting the view is known which uses synchronized scanning. In the synchronized scanning approach, both the laser beam and viewing point is scanned across the field. In this manner, the detector only looks where the laser is going. This method does require an active scan, but can be made more selective to what the detector sees. The view can not be completely restricted with synchronized scanning if an array or lateral effect photodiode is to provide any instantaneous range, but it at least affords some control.

A more extreme variation of the synchronized scanning type of approach is the use of an active point seeking triangulation system. With an active point seeking triangulation system, a single point detector is limited to a very narrow view, at a constant angle, which is then translated across the path of the laser beam. The detector now has the advantage that it can resolve the distribution of light seen along that particular angle, and potentially decide on which signals are the correct ones. Reflections that do not travel along the view axis are not seen at all. The limitations of this approach are that more time is consumed in seeking each point, and comparatively low light collection is used to maintain high angle separation.

Another approach is the use of telecentric optics, which have the added advantage of controlling the f-number and view perspective to the object surface. The telecentric effect is realized by placing a flat field stop at one focal length beyond a lens, which in turn views the area of interest at one focal length (thus creating an image at infinity). The resulting light rays, when brought back to an image by a second lens, have the property that the central ray of each bundle is parallel to all other central rays (a constant view angle) and the bundle of rays from each point seen is of the same cone angle and hence f-number. A telecentric view provides control over what is viewed (blocking all other light) but with the restriction that the object distance becomes a fixed distance. Although the geometry does not change as the distance to the object changes from one focal distance, vignetting does come into play. Most point based gages use the laser as the normal known axis of measurement, thus requiring an off-axis view from the detection system. This off-axis view, unless made as a view of the laser light plane as discussed previously, is necessarily not completely compatible with the restrictions of a true telecentric system.

An object of the present invention is to improve the accuracy and repeatability of laser gaging systems, particularly when measuring object surfaces having scattering or translucent surfaces.

A further object of the present invention is to provide enhanced resolution and noise rejection in laser gaging systems and to reduce errors and uncertainties caused by stray reflections such as ghosts, halos, star patterns and beat patterns.

Another object of the present invention is to increase the accuracy and functionality of passive optical gaging systems and reduce the need for slower and more expensive active laser gaging systems.

Still another object of the present invention is to increase the accuracy and reliability of conventional laser gaging systems without requiring any increase in data collection and processing times.

A further object of the present invention is to utilize the high resolution and good noise rejection provided by telecentric optics and confocal microscopy approaches in laser gaging systems and to eliminate the need for additional scanning to obtain reliable and repeatable measurements.

To provide these improved operating characteristics, applicant installs a filter between the object surface and the detector array that limits the incidence angles of the light allowed to reach the detector array to light that appears to have originated along the detection axis between the minimum and maximum distances the laser gaging system is capable of measuring. Two embodiments of the inventive filter are disclosed. In the first embodiment, a slit filter is installed at the image plane of a fast viewing lens. In the second embodiment, a grating element, such as a tandem holographic filter, is installed in combination with the slit filter to not only pass only the best focus light as predicted by the image of the laser beam path, but to also further limit the acceptable incidence angles of light allowed to reach the receivers. Both embodiments of the filter restrict the incidence angles of the light allowed to reach the detector array and increase the accuracy and reliability of the laser gaging systems, particularly when the objects being measured have scattering or translucent surfaces.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
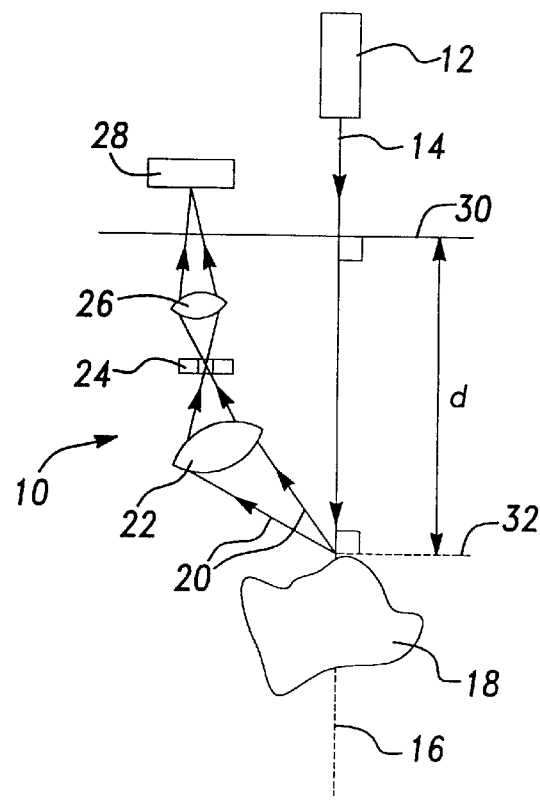
FIG. 1 is a schematic view of a laser gaging system in accordance with this invention, incorporating a slit filter.

A first embodiment of a laser gaging system in accordance with this invention is shown in schematic form in FIG. 1 and is generally designated by reference number 10. Laser gaging system 10 consists of laser 12, collection lens 22, slit filter 24, focus lens 26 and light sensor array 28.

Laser 12 projects a highly localized light beam 14 along a detection axis 16 toward an object surface 18 located on the detection axis. Light beam 14 illuminates a spot on the object surface 18 and creates an array of diffusely reflected light rays reflected in all directions away from the object surface (and typically originating directly from the illuminated spot). Certain diffusely reflected light rays 20 reach collection lens 22 where they are focused toward slit filter 24 and focus lens 26. The diffusely reflected light rays 20 that pass through slit filter 24 and focus lens 26 are focused on light sensor array 28. Light sensor array 28 consists of an array of light sensors which generate an electrical signal that indicates the position within the light sensor array in which the diffusely reflected light rays 20 are received. Because the positions and orientations of laser 12, collection lens 22, focus lens 26 and light sensor array 28 are fixed with respect to one another, laser gaging system 10 is capable of determining, by triangulation, the distance d between a fixed reference datum 30, which is perpendicular to the detection axis 16, and a line 32 parallel to the reference datum which intersects the point where light beam 14 illuminates the surface of object 18, based solely on where diffusely reflected light 20 is received within light sensor array 28.

While referred to as a "laser" throughout this application, laser 12 can comprise any device capable of projecting a highly localized beam of electromagnetic radiation which would be diffusely reflected by the surface of an object 18, such as a laser, a maser or a light emitting diode (LED). Light beam 14 can, correspondingly, comprise any wavelength of electromagnetic radiation suitable for being diffusely reflected by the surface of object 18 and detected by light sensor array 28.

Collection lens 22, in accordance with the telecentric approach, preferably creates an intermediary image with a very low f-number, which can then be re-imaged and re-enlarged by focus lens 26 to provide good position discrimination.

Slit filter 24 is located between collection lens 22 and focus lens 26 and restricts the incidence angles of the light rays able to proceed toward light sensor array 28. The process used to select the proper type and position of slit filter 24 will be discussed in detail below.

Focus lens 26 reforms the spot image and focuses it on the detecting surface of light sensor array 28. Light sensor array 28 can comprise any type of light or electromagnetic radiation sensor or array of sensors have the ability to receive diffusely reflected light rays 20 along a range of predetermined locations and are capable of determining in which location the light rays are striking it.

Figure 2:
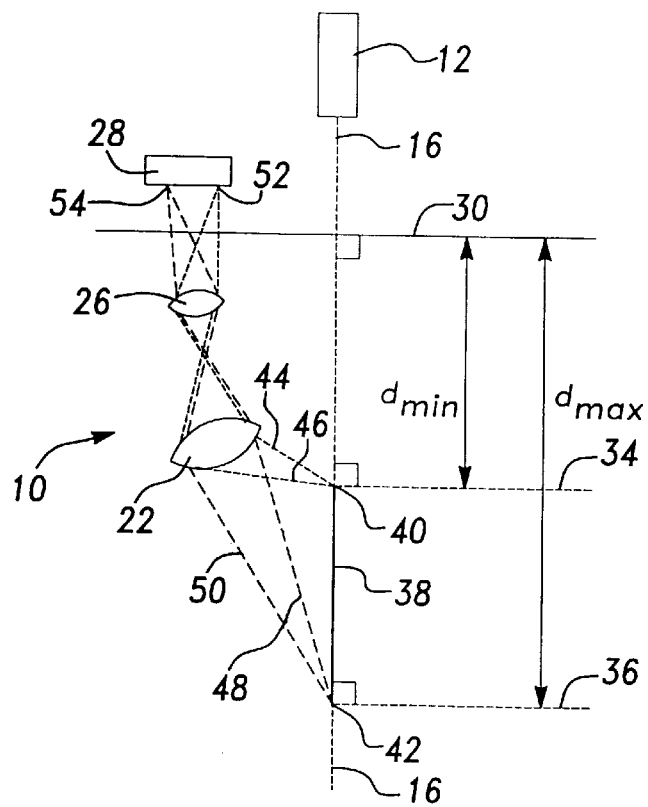
FIG. 2 is a schematic view of the laser gaging system from FIG. 1 showing example raypaths used when determining proper filter selection and placement.

FIG. 2 illustrates how the proper type and position of slit filter 24 are determined. Laser gaging systems are typically designed to measure objects between a fixed range of distances. In FIG. 2, the minimum measurable distance is labelled $d_{min}$ and the maximum measurable distance is labelled $d_{max}$.

To simplify the following discussion, the orientation of detection axis 16 will be referred to as if it were directly up and down, with the light beam 14 being projected directly downward by laser 12, although it should be understood that the laser gaging system 10 will work in an identical manner in any orientation. Line 34 represents the elevation of an object located at the minimum measurable distance and line 36 represents the elevation of an object at the maximum measurable distance. Located between line 34 and line 36 on detection axis 16 is detection window 38. Object surfaces cannot be measured by laser gaging system 10 unless they are positioned within detection window 38. The area along detection axis 16 illuminated by light beam 14 is sometimes referred to as the illuminated area and the portion of the illuminated area comprising detection window 38 is sometimes referred to detection section of the illuminated area. The cross-sectional area of detection window 38 (visible from the perspective of laser 12) will be as wide as the highly localized beam of light 14 projected by laser 12 is at that point.

The slit filter may be located at any point between detection window 38 and light sensor array 28, but will preferably be located between collection lens 22 and focus lens 26. The geometry of the slit will depend, of course, on where the slit filter is positioned within laser gaging system 10. This slit may, in fact, be positioned at some angle to the optical axis and located at the actual image plane of the projected line location, in accordance to the Schiempflug condition.

Minimum distance location 40 represents the highest point within detection window 38 which laser gaging system 10 can measure. A pair of example raypaths, minimum location raypaths 44 and 46, are shown which originate from minimum distance location 40 and are incident on collection lens 22. Minimum location raypaths 44 and 46 are re-imaged and re-enlarged after passing through collection lens 22 by focus lens 26 and then are incident on the minimum distance point 52 point of light sensor array 28. To avoid filtering desirable signal light, if slit filter 24 is positioned between collection lens 22 and focus lens 26, one end of the slit should preferably be positioned so that an example raypath originating from minimum distance location 40 and passing through the part of collection lens 22 farthest from detection axis 16 (generally in the location of minimum location raypath 46) is not blocked as it proceeds toward focus lens 26 but an example raypath originating from outside this envelope will be blocked.

Conversely, maximum distance location 42 represents the lowest point within detection window 38 which laser gaging system 10 can measure. A pair of example raypaths, maximum location raypaths 48 and 50, are shown which originate from maximum distance location 42 and are incident on collection lens 22. Maximum location raypaths 48 and 50 are re-imaged and re-enlarged after passing through collection lens 22 by focus lens 26 and then are incident on the maximum distance point 54 point of light sensor array 28. To avoid filtering desirable signal light, the other end of the slit should preferably be positioned so that an example raypath originating from maximum distance location 42 and passing through the part of collection lens 22 nearest detection axis 16 (generally in the location of maximum location raypath 48) is not blocked as it proceeds toward focus lens 26 but an example raypath originating from outside this envelope will be blocked.

The width of the slit in slit filter 24 can be calculated by taking the width of the detection window (which will essentially be fixed if the light source is a laser) and then factoring in any magnification or reduction effect caused by collection lens 22 (assuming the slit filter is located between collection lens 22 and focus lens 26).

Any spreading of the beam, or multiple reflections would come from a different distance, even if within the field-of-view of light sensor array 28, and therefore would be greatly attenuated by the fast focal plane block even if of similar intensity to the primary strike point of the laser beam. Slit filter 24 will not eliminate all secondary reflections and scatter, but will greatly reduce their influence on any center of mass detection. For example, a double bounce reflection, within the plane of incidence of the illumination and viewing systems, on a rough surface separated by 2 spot widths of a 0.5 millimeter laser beam at 50 millimeters, would be diminished by up to about 32 percent by a focal plane slit. Of course, any spreading or scatter out of the plane of incidence is essentially completely rejected by the slit. The faster the lens and the smaller the spot relative to any spread or diffusion that might be expected by the surface, the better the discrimination would be between the desired signal and the associated noise.

While a slit filter 24 of the type described above offers a substantial increase in the signal to noise ratio for laser gaging system 10, particularly for scattering or translucent surfaces, a more selective version of this approach is the use of grating technology, such as a Bragg diffraction filter or a tandem holographic filter, particularly in combination with the slit filter. The grated filter can be designed and positioned using in the same principles used to design and position the slit filter described above. This grated filter would not only pass only the best focus light as predicted by the image of the laser beam path, but it also further limits the acceptable angles to get to that location. Any out-of-focus light from scatter or ghosts that approaches the slit would be focusing at a different location from that particular location on the slit than the desired light. The Bragg diffraction filter or tandem holographic filter would limit the direction of the rays of light at each location on the slit, like a set of louvers, so that only certain paths would impinge upon the slit at all. This tandem filter approach would reject almost all of the ghost or scattered light, and make the return highly spatially coherent (highly directional). By incorporating the type of grated filters described in the paper "Alignment verification using holographic correlation", Optical Testing and Metrology II, SPIE Proc. Vol 954, p. 34 (1988), coauthored by Applicant and incorporated herein by reference, a discrimination of better than 100 to 1 is possible.

Figure 3:
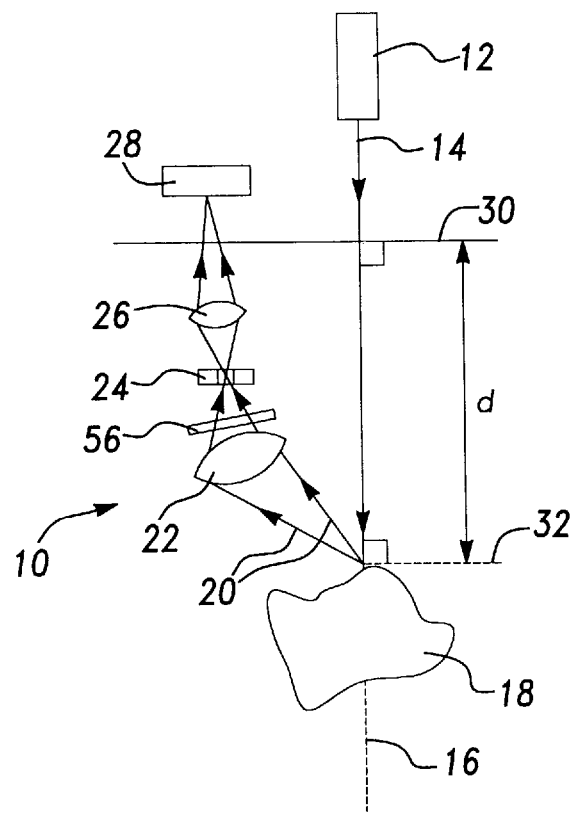
FIG. 3 is a schematic view of a laser gaging system from FIG. 1, further incorporating a tandem holographic filter.

FIG. 3 illustrates in schematic format, laser gaging system 10, having a laser 12, a collection lens 22, a slit filter 24, a focus lens 26, a light sensor array 28 and further incorporating a grated filter 56 as described above. Grated filter 56 can be a tandem holographic filter, a Bragg diffraction filter, or any equivalent optical element. It will be readily understood by those of ordinary skill in the art that grated filter 56 will improve the signal to noise ratio of laser gaging system 10 even in the absence of slit filter 24 although the incorporation of slit filter 24 in combination with grated filter 56 is preferred.

It is to be understood that the invention is not limited to the exact construction illustrated and described above, but that various changes and modifications may be made without departing from the spirit and scope of the invention as defined in the following claims.

I claim:

1. A laser gaging system for determining the distance from a reference datum to an object surface located on a detection axis, said laser gaging system comprising:

a light source, fixed with respect to said reference datum, for projecting a highly localized light beam along said detection axis, thereby creating an illuminated area about said detection axis and illuminating said object surface located within said illuminated area, a light sensor, fixed with respect to said light source, having means for determining when light diffusely reflected by said object surface is striking said light sensor, a collection lens, fixed with respect to said light sensor and located between said object surface illuminated by said light beam and said light sensor, said light source, said collection lens and said light sensor positioned so that a portion of said light beam illuminating said object surface is diffusely reflected by said object surface, passes through said collection lens, and is projected onto said light sensor, thereby allowing said distance from said reference datum to said object surface to be calculated, and a filter, positioned between said illuminated area and said light sensor, that prevents light appearing to originate from outside said illuminated area from reaching said light sensor.

2. A laser gaging system according to claim 1 wherein said detection axis is perpendicular to said reference datum.

3. A laser gaging system according to claim 1 wherein said filter comprises a slit filter.

4. A laser gaging system according to claim 3 wherein said collection lens has an optical axis and defines an image plane of said detection axis and said slit filter is positioned at said image plane and at an angle to said optical axis in accordance with the Schiempflug condition.

5. A laser gaging system according to claim 1 wherein said filter comprises a Bragg diffraction filter.

6. A laser gaging system according to claim 1 wherein said filter comprises a tandem holographic filter.

7. A laser gaging system according to claim 1 wherein said filter comprises a slit filter combined with a tandem holographic filter.

8. A laser gaging system according to claim 1 further including a focus lens between said collection lens and said sensor means.

9. A laser gaging system according to claim 8 wherein said filter comprises a slit filter combined with a tandem holographic filter, said slit filter and said tandem holographic filter located between said collection lens and said focus lens.

10. An optical gaging system for determining the distance from a reference datum to an object surface located on a detection axis, said laser gaging system comprising:

a light source, fixed with respect to said reference datum, for projecting a highly localized light beam along said detection axis, thereby creating an illuminated area and illuminating said object surface located within said illuminated area, a light sensor, fixed with respect to said light source, a lens, fixed with respect to said light sensor and positioned between said object surface illuminated by said light beam and said light sensor, said light source, said lens and said light sensor positioned so that a portion of said light beam illuminating said object surface is diffusely reflected by said object surface, is concentrated by said lens, and is projected onto said light sensor, thereby allowing said distance from said reference datum to said object surface to be calculated from the triangulation effect, and a holographic filter, positioned between said illuminated area and said light sensor, that prevents light originating from outside of the envelope of raypaths between said illuminated area and said light sensor from reaching said light sensor.

11. An optical gaging system for determining the distance from a reference datum to an object surface located on a detection axis and having a minimum measurement distance and a maximum measurement distance, said optical gaging system comprising:

a light source, fixed with respect to said reference datum, for projecting a highly localized light beam along said detection axis, thereby creating an illuminated area and illuminating said object surface located within said illuminated area, a light sensor, fixed with respect to said light source, a lens, fixed with respect to said light sensor and positioned between said object surface illuminated by said light beam and said light sensor, said light source, said lens and said light sensor positioned so that a portion of said light beam illuminating said object surface is diffusely reflected by said object surface, is concentrated by said lens, and is projected onto said light sensor, thereby allowing said distance from said reference datum to said object surface to be calculated from the triangulation effect, and a filter, positioned between said illuminated area and said light sensor, that prevents light originating from outside of the envelope of raypaths between said illuminated area and said light sensor from reaching said light sensor.

12. An optical gaging system according to claim 11 wherein said illuminated area has a detection section which comprises a section of said illuminated area that is not less than said minimum distance away from said reference datum and not more than said maximum distance away from said reference datum and said filter stops light originating from outside of the envelope of raypaths between said detection section of said illuminated area and said light sensor from reaching said light sensor.

13. An optical gaging system according to claim 11 wherein said filter comprises a slit filter.

14. A laser gaging system according to claim 13 wherein said slit filter is positioned approximately one focal length beyond said lens.

15. A laser gaging system according to claim 13 further including a grated filter between said illuminated object surface and said slit filter that limits the incidence angles of light rays impinging of said slit filter.

16. A distance measurement system for determining the distance between a reference datum and an object surface, said distance measurement system comprising:

projection means for projecting a highly localized beam of electromagnetic radiation, thereby creating an irradiated area within said beam of electromagnetic radiation and irradiating said object surface located within said irradiated area, reception means for receiving electromagnetic radiation diffusely reflected by said irradiated object surface, said projection means and said reception means positioned such that said distance from said reference datum to said object surface may be calculated, and filtering means, located between said irradiated object surface and said reception means and fixed with respect to said irradiated area, for blocking electromagnetic radiation originating from outside the envelope of raypaths between said irradiated area and said reception means.

17. A distance measurement system according to claim 16 wherein said filtering means comprises a slit filter.

18. A distance measurement system according to claim 16 wherein said filtering means comprises a grated filter.

19. A distance measurement system according to claim 16 wherein said filtering means comprises a slit filter and a grated filter.

20. A distance measurement system according to claim 19 wherein said grated filter comprises a tandem holographic filter.

* * * * *